US006959094B1

(12) United States Patent
Cascone et al.

(10) Patent No.: US 6,959,094 B1
(45) Date of Patent: Oct. 25, 2005

(54) APPARATUS AND METHODS FOR SYNTHESIS OF INTERNAL COMBUSTION ENGINE VEHICLE SOUNDS

(75) Inventors: Kim Cascone, Pacifica, CA (US); Daniel T. Petkevich, San Jose, CA (US); Gregory P. Scandalis, Mountain View, CA (US); Timothy S. Stilson, Mountain View, CA (US); Kord F. Taylor, San Jose, CA (US); Scott A. Van Duyne, Palo Alto, CA (US)

(73) Assignee: Analog Devices, Inc., Norwood, MA (US)

( * ) Notice: Subject to any disclaimer, the term of this patent is extended or adjusted under 35 U.S.C. 154(b) by 615 days.

(21) Appl. No.: 09/839,072

(22) Filed: Apr. 20, 2001

Related U.S. Application Data

(60) Provisional application No. 60/199,011, filed on Apr. 20, 2000.

(51) Int. Cl.[7] .................................................. H04B 1/00
(52) U.S. Cl. .......................................... 381/86; 381/61
(58) Field of Search ....................... 381/86, 61; 700/94

(56) References Cited

U.S. PATENT DOCUMENTS 5,237,617 A * 8/1993 Miller ......................... 381/61
5,361,705 A * 11/1994 Powell ......................... 104/60
5,633,993 A * 5/1997 Redmann et al. ........... 345/419
5,635,903 A * 6/1997 Koike et al. ................ 340/441
5,998,724 A * 12/1999 Takeuchi et al. .............. 84/622
6,356,185 B1 * 3/2002 Plugge et al. ............ 340/384.3

OTHER PUBLICATIONS

Precursor System, Feb. 1999.

* cited by examiner

*Primary Examiner*—Sinh Tran
*Assistant Examiner*—Justin Michalski
(74) *Attorney, Agent, or Firm*—Koppel, Jacobs, Patrick & Heybl

(57) ABSTRACT

Computer-implemented techniques are provided for synthesizing sounds of an internal combustion engine vehicle using a physical model of the vehicle. In general terms, the method includes independently generating and/or synthesizing separate components of the vehicle sound, then combining these components to produce a final sound. Using a physical model of the vehicle, the separate components of the vehicle sound are independently generated from vehicle control parameters characterizing the operating conditions of the vehicle. The components are then combined using mixers and equalizers to produce a realistic vehicle sound. The present technique allows independent control of the separate components of the vehicle sound, is not limited to specific vehicles, and does not require recorded sounds taking large amounts of storage space.

50 Claims, 10 Drawing Sheets

APPARATUS AND METHODS FOR SYNTHESIS OF INTERNAL COMBUSTION ENGINE VEHICLE SOUNDS

RELATED APPLICATION

This application claims priority based upon provisional patent application Ser. No. 60/199,011, "Methods for Synthesis of Internal Combustion Engine Vehicle Sounds", filed Apr. 20, 2000.

FIELD OF THE INVENTION

The present invention relates to electronic and computer synthesis of sounds. More specifically, it relates to devices and methods for the synthesis of internal combustion engine vehicle sounds using physical models.

BACKGROUND OF THE INVENTION

Many computer-implemented games and simulations involve internal combustion engine vehicles such as automobiles, motorcycles, airplanes, and boats. An important part of the simulation is the generation of sounds, which should resemble real vehicle sounds as much as possible. In particular, as the simulated vehicle conditions change, the computer generated sound should change accordingly. One known technique for generating such vehicle sounds uses a set of digitized recordings of the vehicle' s sound under a few specific conditions (e.g., at certain vehicle speeds). These recordings are then played back using an interpolation technique to generate a vehicle sound under any conditions (e.g., at any vehicle speed). This technique, however, has several problems and disadvantages. For example, the recordings require significant memory storage space, and are limited to a single vehicle. Moreover, the recordings typically vary only one parameter (e.g., vehicle speed) while ignoring the possible variations of other independent parameters (e.g., engine load). As a result, the generated sound is either unrealistic or requires many more recordings and much more memory storage space to account for these additional parameters. Another problem with this technique is that the interpolation techniques introduce unrealistic distortions into the generated sounds. For example, an interpolation between two recorded vehicle speeds might involve oversampling a recording at a higher speed and/or undersampling a recording at a slower vehicle speed. Some components of the vehicle sound, however, do not scale with the engine speed in this manner. The result is that the generated sound will be unrealistic. Yet another disadvantage of using recordings is that they are specific to particular vehicles. In order for a game or simulation to allow for a variety of vehicle types, a very large number of recordings must be made under a large number of different vehicle operating conditions, and all the recordings must be stored. Clearly, there is a need for improved techniques for generating vehicle sounds for computer simulators and games.

SUMMARY OF THE INVENTION

In one aspect of the present invention, computer-implemented techniques are provided for synthesizing sounds of an internal combustion engine vehicle using a physical model of the vehicle. In general terms, the method includes independently generating and/or synthesizing separate components of the vehicle sound, then combining these components to produce a final sound. Using a physical model of the vehicle, the separate components of the vehicle sound are independently generated from vehicle control parameters characterizing the operating conditions of the vehicle. The components are then combined using mixers and equalizers to produce a realistic vehicle sound. The present technique allows independent control of the separate components of the vehicle sound, is not limited to specific vehicles, and does not require recorded sounds taking large amounts of storage space.

In preferred embodiments of the invention, the physical model of the vehicle has sound-producing and sound-modifying signal processing blocks (e.g., spark generators, fuel ignition, and exhaust system), and also provides for additional noises (e.g., wind and road noise, suspension noise, and transmission noise). By adjusting the synthesis parameters, the techniques can be used to synthesize sounds produced by a wide variety of vehicle types, including but not limited to cars, trucks, motorcycles, boats, propeller airplanes, and trains.

DETAILED DESCRIPTION

The following description and related figures illustrate the techniques of the present invention in the context of various specific embodiments. Those skilled in the art will appreciate that many of the details of the following embodiments are not necessary for the practice of the invention, and are included for illustrative purposes only. The techniques of the present invention may be implemented in the form of instructions stored in a memory and executed by a general purpose microprocessor present in a desktop computer, laptop computer, video arcade game, and the like. The techniques of the present invention may also be implemented in hardware, i.e., using an ASIC that is part of a computer system. The synthesized signals from the microprocessor or ASIC are output to a user using an audio sound system that is either internal to the system or part of an external sound system connected to the computer system. The hardware preferably includes conventional state-of-the-art components well known in the art. Because the primary distinguishing features of the present invention relate to the specific synthesis techniques, the following description will focus on these techniques.

Figure 1:
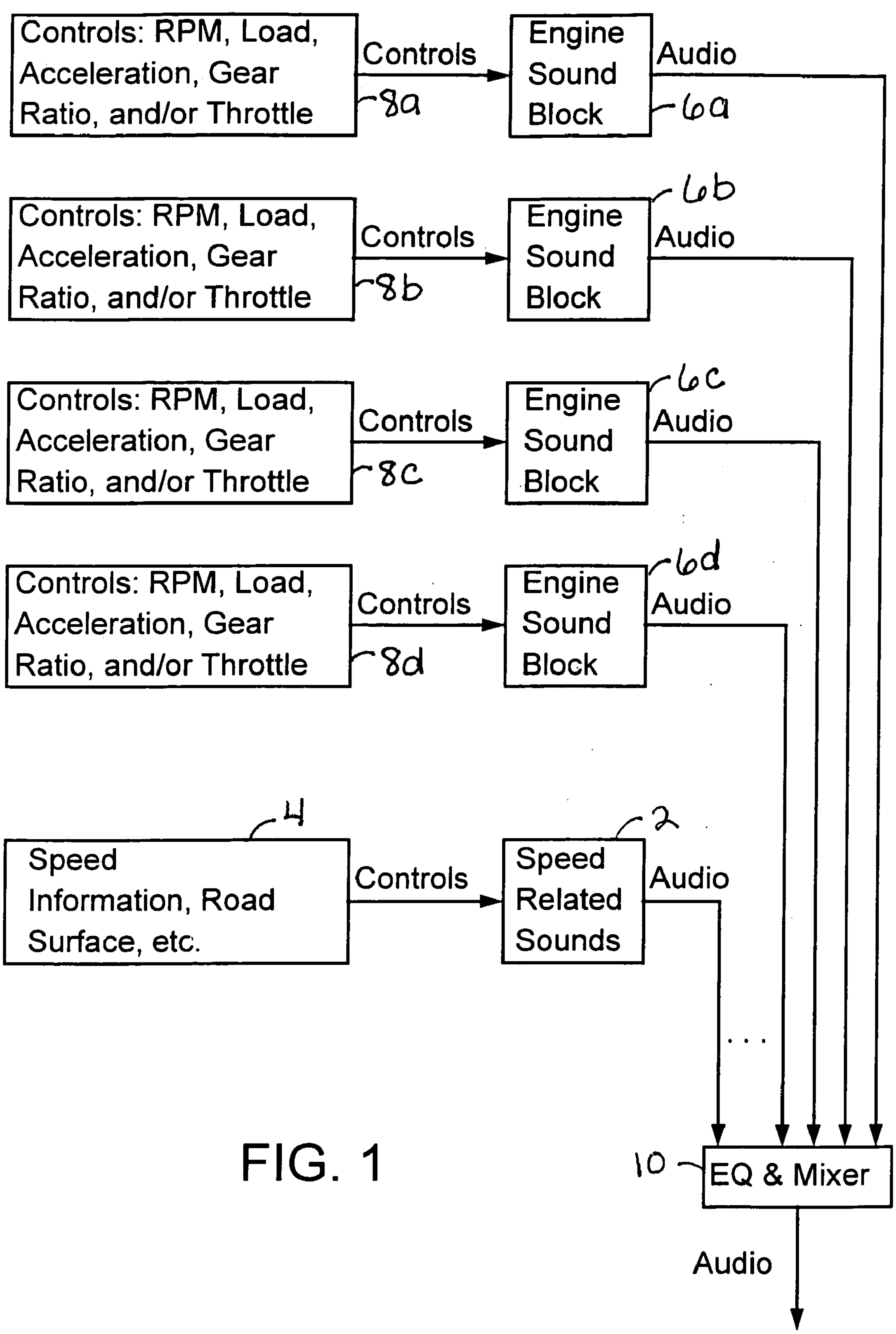
FIG. 1 is a block diagram illustrating a synthesis architecture for creating a sound produced by a four-engine vehicle, including speed-related sounds such as wind noise.

FIG. 1 is a block diagram illustrating a synthesis architecture for creating a sound produced by a four-engine vehicle, including speed-related sounds 2 such as wind noise which are produced in response to sound control parameters 4. This architecture is appropriate for synthesizing the sound of a four-engine aircraft. A single engine aircraft (or a car) would have a similar architecture, but with just one engine sound block 6*a* rather than four 6*a*, 6*b*, 6*c*, 6*d* produced in response to one set of engine control parameters 8*a* rather than four 8*a*, 8*b*, 8*c*, 8*d*. The speed-related sounds block 2 is preferable, but not necessary. In the case of an air-craft, it primarily synthesizes wind noise. In the case of a land or water vehicle, it preferably synthesizes additional noises. For a land vehicle, it will preferably synthesize road noise, and for a water vehicle it will preferably synthesize water noise. It should be noted that these noises are related only to the speed of the vehicle, and do not depend directly on the vehicle engine. For example, a car coasting down a hill with its engine off will generate wind noise even though the engine is stopped. Conversely, a car parked at the starting line and racing its engine just before a race begins will have engine noise but no speed-related wind noise. Because these separate signal processing blocks 2, 6*a*–6*d* are independently controlled, the appropriate sound under these various vehicle conditions will be realistically synthesized. The audio signals generated by these separate blocks are combined in an EQ and mixer 10 to produce the final vehicle sound. The EQ filter, which is typically a simple first-order filter, can be controlled to adjust the relative strengths of the various components, accounting for whether the sound is being heard from inside the vehicle or outside the vehicle, from in front of the vehicle or behind the vehicle, from nearby or far away, and so on. Signal processing at the output stage can also be used to simulate other effects, such as acoustic reflections from nearby structures.

Figure 2:
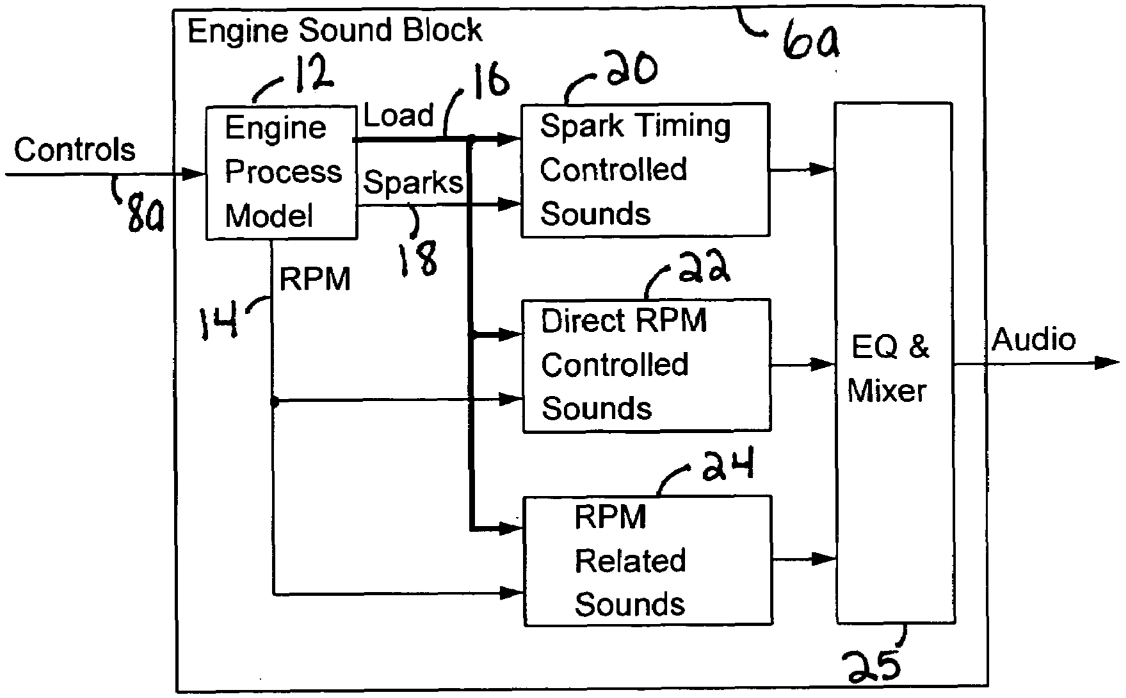
FIG. 2 is a diagram illustrating the details of engine sound block shown in FIG. 1.

FIG. 2 is a diagram illustrating the details of engine sound block 6*a* shown in FIG. 1. The control parameters 8*a* provided to the engine sound block as input are preferably parameters that represent natural physical operating controls or conditions of the vehicle being modeled. These controls preferably comprise one or more of the following parameters: engine RPM, engine load, vehicle acceleration, transmission gear ratio, throttle position, propeller pitch, and fuel mixture. Other parameters may also be included among these control parameters, as appropriate. These control parameters are used by an engine process model 12 to generate various derived quantities, such as RPM 14, engine load 16, and spark events 18. In cases where the RPM is not a primary control input, it is calculated. Similarly, if the engine load is not provided, it is calculated. If these parameters are provided as input, however, then they are simply passed through the engine process model 12 to the other signal processing blocks, as shown in the figure. The specifics of the engine process model will be described in more detail below in relation to FIGS. 3A and 3B. The load and spark event signals 16, 18 from the engine process model enter a spark timing controlled sound processing block 20, which will be described in more detail below in relation to FIG. 4. This block 20 models the engine combustion chamber, exhaust manifold, and other vehicle systems through which the spark-initiated explosive sounds propagate. The load and RPM signals 16, 18 from the engine process model 12 are input to the direct RPM controlled sound processing block 22 and RPM related sound processing block 24, as shown. The direct RPM controlled sound processing block 22, which will be described in more detail in relation with FIG. 5, models engine sound components that are directly tuned to RPM, but are not required to be phase-locked with spark timings. These include nonspecific timbral components that a sound designer may wish to include to enhance the sound quality, or specific vehicle sounds (such as a feedback FM helicopter model) that are created through algorithms which cannot be driven by spark timing models of FIGS. 3A and 3B. The RPM related sound processing block 24, which will be described in more detail in relation with FIG. 6, models various engine sounds related to the RPM, such as whines, whistles, roars, turbines, and rumbles. The tone qualities of the sounds generated by these blocks is controlled by the engine load signal. The sounds produced by these various blocks are combined in an equalizer and mixer 25, then output from the engine sound block.

Figure 3A:
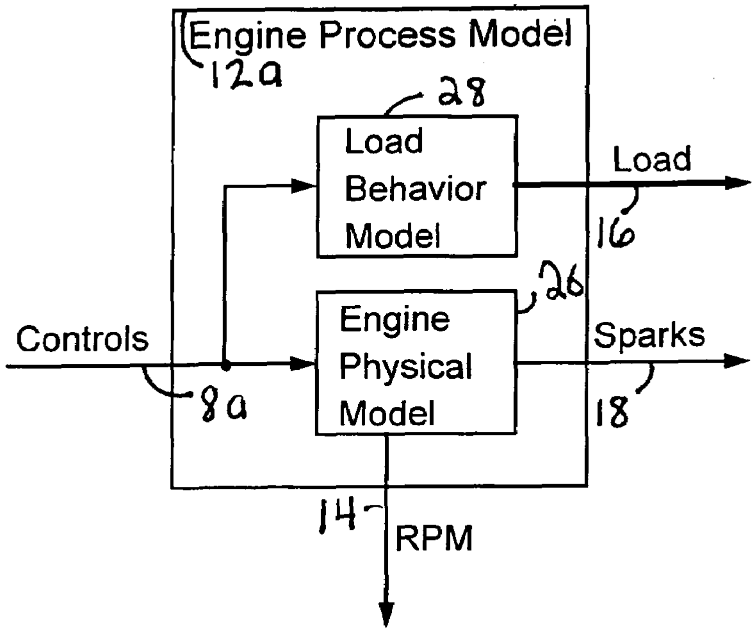
FIGS. 3A and 3B are block diagrams of two embodiments of an engine process model signal processing block shown in FIG. 2.
Figure 3B:
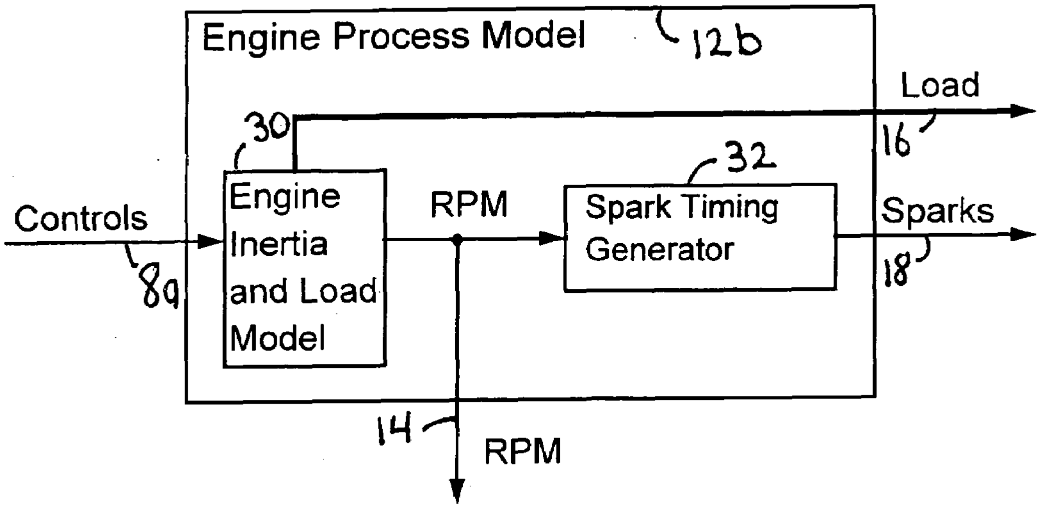

FIGS. 3A and 3B are block diagrams of two embodiments of an engine process model signal processing block shown in FIG. 2. The embodiment 12*a* shown in FIG. 3A illustrates a physical model 26 which generates RPM and spark event signals together. A load behavior model 28 independently generates engine load parameters 16 from the control inputs. In this embodiment, a "gas pedal" control input can control the Load directly, and the RPM 14 and Sparks 18 are generated together through a physical model 26 of a combustion engine driven by the gas pedal input signal. This physical model has the advantage that it produces very authentic non-periodic "rough" engine sounds.

The embodiment 12*b* shown in FIG. 3B illustrates a model in which the sparks 18 and RPM 14 are generated separately. An engine inertia and load model 30 generates load 16 and RPM 14 parameters. The RPM parameter, in turn, is input to a spark timing generator 32 that produces spark event signals 18. This approach is less realistic than the physical model shown in FIG. 3A, but it has the advantage that it can take RPM as input. The engine inertial and load model 30 can be implemented in various ways. In a preferred embodiment, it is implemented in one of three possible ways, depending on the particular application:

1. A throttle input drives an RPM and load output directly through first order smoothing effects such that RPM lags behind the throttle position modeling engine inertia at a Longer T60 (e.g., 5–10 sec.), and Load tracks throttle position much more quickly (e.g., at a T60 of 0.3 sec.).
2. RPM tracks an RPM input directly, and Load corresponds to an acceleration derived as a first derivative of RPM.
3. Load and RPM are controlled directly by an external Car physics model generated from another application program (such as a race car simulation game).

Unpredictable behaviors (e.g., a "rough" engine) can be introduced using a stochastic modulation of the RPM.

Figure 4:
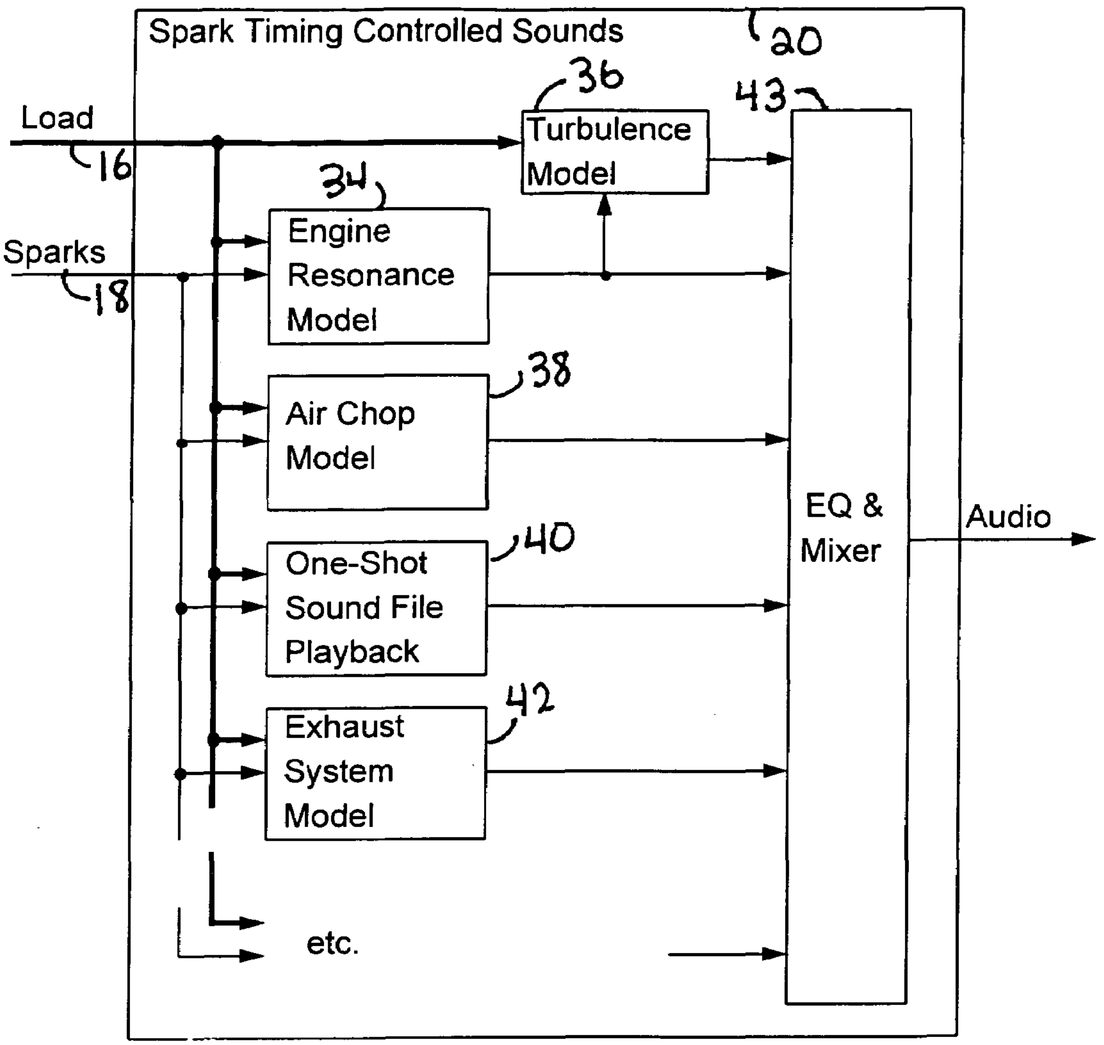
FIG. 4 is a block diagram illustrating the components of spark timing controlled sound signal processing block shown in FIG. 2.

FIG. 4 is a block diagram illustrating the components of the spark timing controlled sound signal processing block 20 shown in FIG. 2. Spark event signals 18 and load signals 16 from the engine process model 12 (i.e., a train of impulses representing spark timings and numerical parameters representing a degree of load) are input to the block 20 and provided to one or more internal blocks, as shown. The engine resonance model block 34, for example, converts each spark impulse into a short resonant pulse (e.g., by passing the impulse through a second order resonant filter whose parameters may depend upon the load signal). The turbulence model block 36 incorporates a pulsed noise model of turbulence. The air chop model 38 simulates air turbulence sounds such as those associated with propeller movement in an airplane. The one-shot sound file playback algorithm (40) can be used to add in recorded or synthesized sounds associated with a single spark of the engine, perhaps individual motorcycle or airplane "puts", or more complex non-physical sounds which may suggest space vehicle qualities. The one-shot sounds file playback algorithm could be used by the sound designer to add in arbitrary spark synchronized sounds components which may enhance the overall vehicle sound. Other blocks could be added here to simulate muffler resonances in an exhaust system model 42, or sounds related to piston movements and reactions which are synchronized with the spark timings. The sounds produced by the various blocks are combined in an equalizer and mixer 43, then output from the spark timing controlled sound block.

Figure 5:
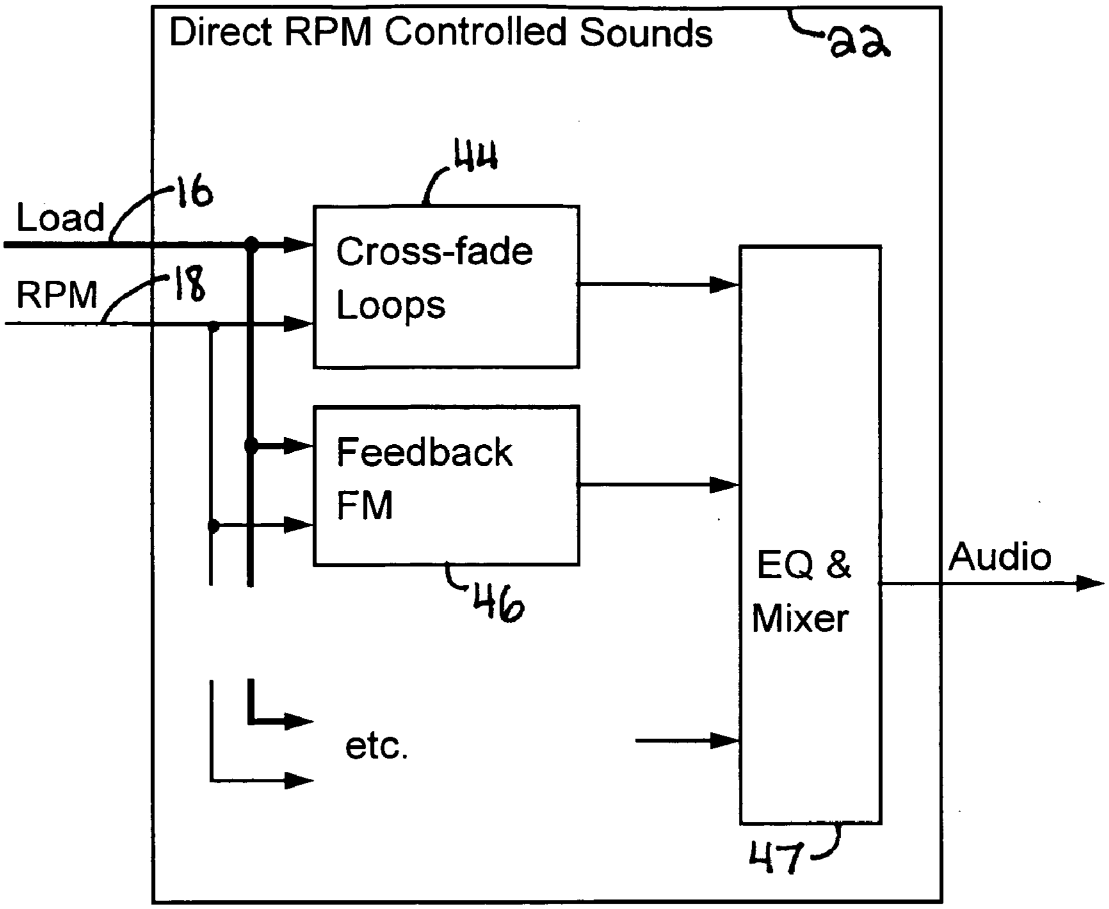
FIG. 5 is a block diagram illustrating the components of the direct RPM controlled sound signal processing block shown in FIG. 2.

FIG. 5 is a block diagram illustrating the components of the direct RPM controlled sound signal processing block 22 shown in FIG. 2. RPM 18 and load 16 signals from the engine process model are input to the block 22 and provided to one or more internal blocks, as shown. The direct RPM controlled sounds are the sounds which are tuned exactly to RPM, but which do not require exact synchronization with the spark timings. The cross-fade loops block 44 could be used to add in recorded loops of real engine sounds, tuned to RPM, or to introduce more hypothetical sounds of spaceships that a sound designer may create. The Feedback FM block 46 could be used to create helicopter-like engine and propeller chop sounds. Other blocks might be used to create RPM tuned sounds that cannot be controlled easily by the spark timing elements of FIGS. 3A and 3B. The sounds produced by the various blocks are combined in an equalizer and mixer 47, then output from the direct RPM controlled sounds block.

Figure 6:
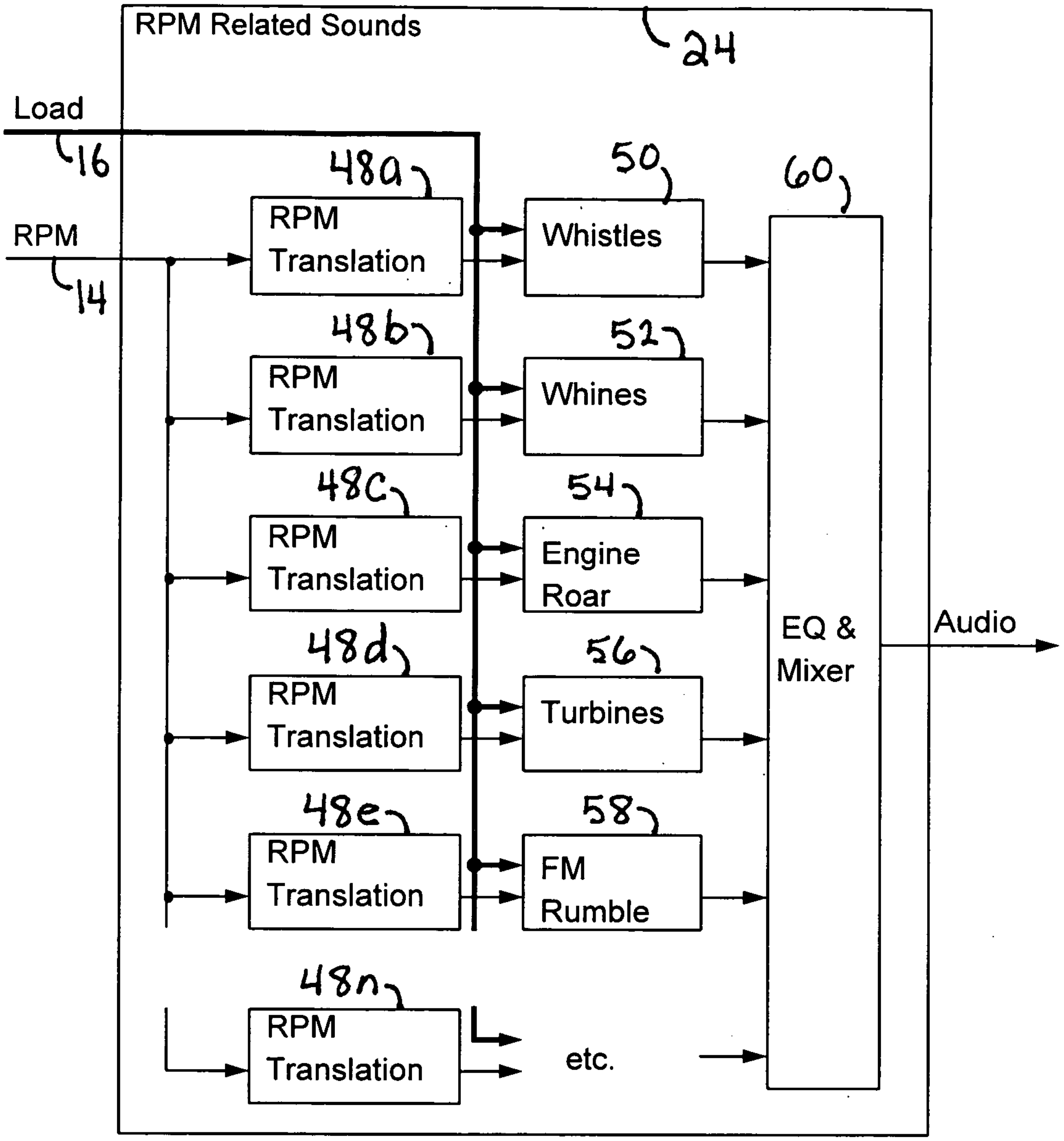
FIG. 6 is a block diagram illustrating the components of the RPM related sound signal processing block shown in FIG. 2.

FIG. 6 is a block diagram illustrating the components of the RPM related sound signal processing block 24 shown in FIG. 2. RPM 14 and load 16 signals from the engine process model 12 are input to the block 24 and provided to RPM translation blocks 48*a*, 48*b*, 48*c*, 48*d*, 48*e* . . . 48*n*, and then to one or more internal blocks, as shown. RPM related sounds are correlated with RPM, but not necessarily in a linear or fixed way. For example a turbo charge sound may increase frequency with increased RPM, but in a more complex way than a direct scaling. The RPM translation blocks convert RPM to frequency and/or other sound control parameters which directly control the sound of the RPM related blocks. The output from these translation blocks is fed to various other blocks that simulate particular noises. For example, the whistles block 50 simulates engine whistle-type noises, the whines block 52 simulates engine whine noises, the engine roar block 54 simulating lower frequency roaring noises, the turbines block 56 is used in vehicles that have turbines in their engines, and the FM rumble block 58 produces rumbling noises. Other blocks might be implemented to simulate non-physical sounds as may be produced from a space vehicle, or a larger-than-life monster truck. These RPM related (but not direct RPM controlled) sounds can add a great deal of liveliness to the overall composite sound by the very fact that their pitch relation to RPM is not constant. It should be noted that the particular combination of blocks used in a particular embodiment will depend on the specific vehicle. Vehicles without turbines, for example, will not make use of the turbine block 56. The signals from these various blocks are combined in an equalizer and mixer 60 and output from the block as an audio signal. As with the blocks in FIGS. 4 and 5, these various blocks may have filters whose parameters depend on the load signal provided to the blocks, as shown.

Figure 7:
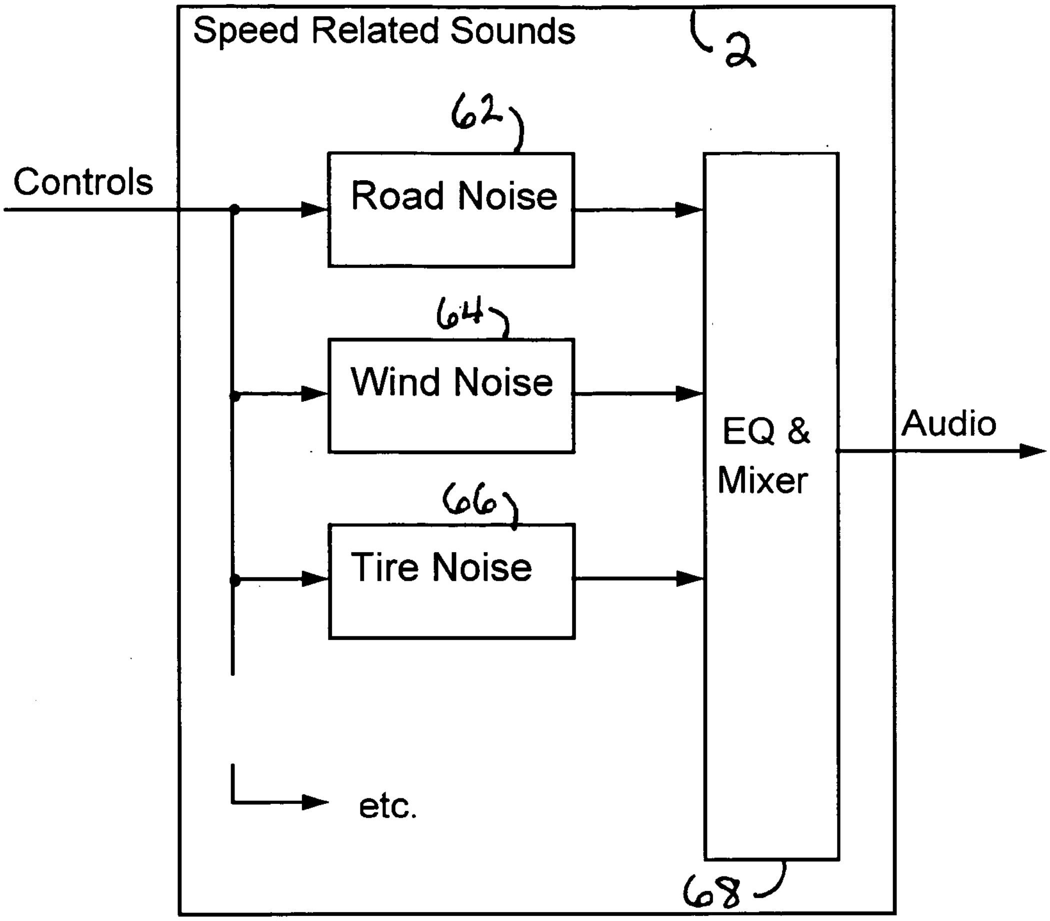
FIG. 7 is a block diagram illustrating the components of the speed related sound signal processing block shown in FIG. 1.

FIG. 7 is a block diagram illustrating the components of the speed related sound signal processing block 2 shown in FIG. 1. Control signals such as vehicle speed and road surface conditions are input to the block and provided to one or more internal blocks, as shown. The road noise block 62 simulates road-related noises that depend on the type of surface, the wind noise block 64 simulates air flow noises due to vehicle movement through the atmosphere, the tire noise block 66 simulates noises due to the type of tire tread, as well as other effects such as tire chains and studs. Other similar blocks can be implemented that are related only to vehicle speed. For example, the clanking sounds related to a tank movement is related to speed, but not engine RPM. It could be implemented by a resonance model of the metallic clanks of the tank treads as they roll over various terrains. Wall scrapes as a car may make as it glances of a wall may be implemented here. Tire skid sounds may be implemented as a speed related algorithm, gated by whether the wheels are turning or not. It should be noted that the particular combination of blocks used in a particular embodiment will depend on the specific vehicle. Aircraft, for example, will primarily have wind noises, although some implementation of runway and tire noise is preferable to properly simulate noises during take-off, landing, and taxi. The signals from these various blocks are combined in an equalizer and mixer 68 and output from the block 2 as an audio signal.

Figure 8:
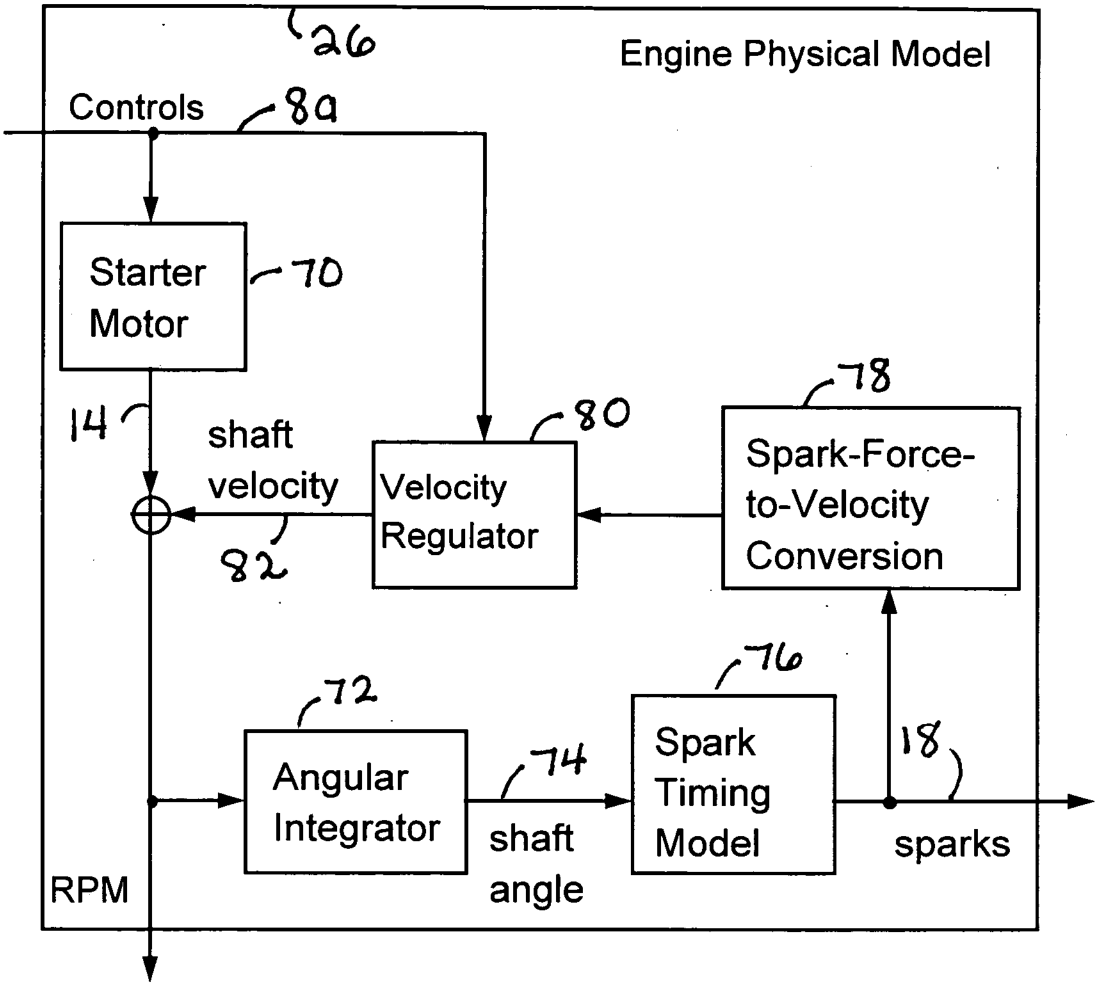
FIG. 8 is a block diagram detailing the engine physical model shown in FIG. 3A.

FIG. 8 is a block diagram detailing the engine physical model 26 shown in FIG. 3A. A starter motor provides an initial instantaneous shaft velocity (RPM) 14 in response to an engine start control signal. An angular integrator 72 generates from the shaft velocity a shaft angle 74, which is input to a spark timing model 76. The spark timing model 76 simulates the firing of sparks at various shaft angles. The output of the spark timing model is a sequence of spark impulse event signals 18 that simulate the firing of various sparks. The spark timing model is preferably implemented by a collection of spark triggers connected in parallel. Each trigger is set to a different shaft angle, so that their spark events are not simultaneous. The spark impulse events from all the triggers are combined in an adder to form a composite sparks signal 18.

The sparks signal 18 from the spark timing model 76 is sent to a spark-force-to-velocity converter 78 which models the physics of the engine that turns an electrical spark into angular shaft velocity. The converter 78 comprises an integrator implemented using a second-order filter for flexibility in tuning. The poles of the filter are preferably placed near z=1, although other frequencies are possible. The computed shaft velocity is sent to a velocity regulator 80 which also models some of the physics of the engine. In particular, the velocity regulator models such factors as load, friction, and throttle. The primary purpose of this block 80 is to prevent the engine from increasing its RPM in an unbounded manner, and to provide a means for controlling the RPM (e.g., with the throttle control signal). The resulting shaft velocity output 82 is injected back into the loop, and the cycle continues.

The engine inertia and load model 30 of FIG. 3B uses the same techniques as the physical engine model 26 described above in relation to FIG. 8. Rather than taking the spark signals 18 from the physical model, however, the embodiment of FIG. 3B generates them with a separate spark timing generator 32, which is composed of an angular integrator and spark timing model, as described in relation to FIG. 8.

Figure 9:
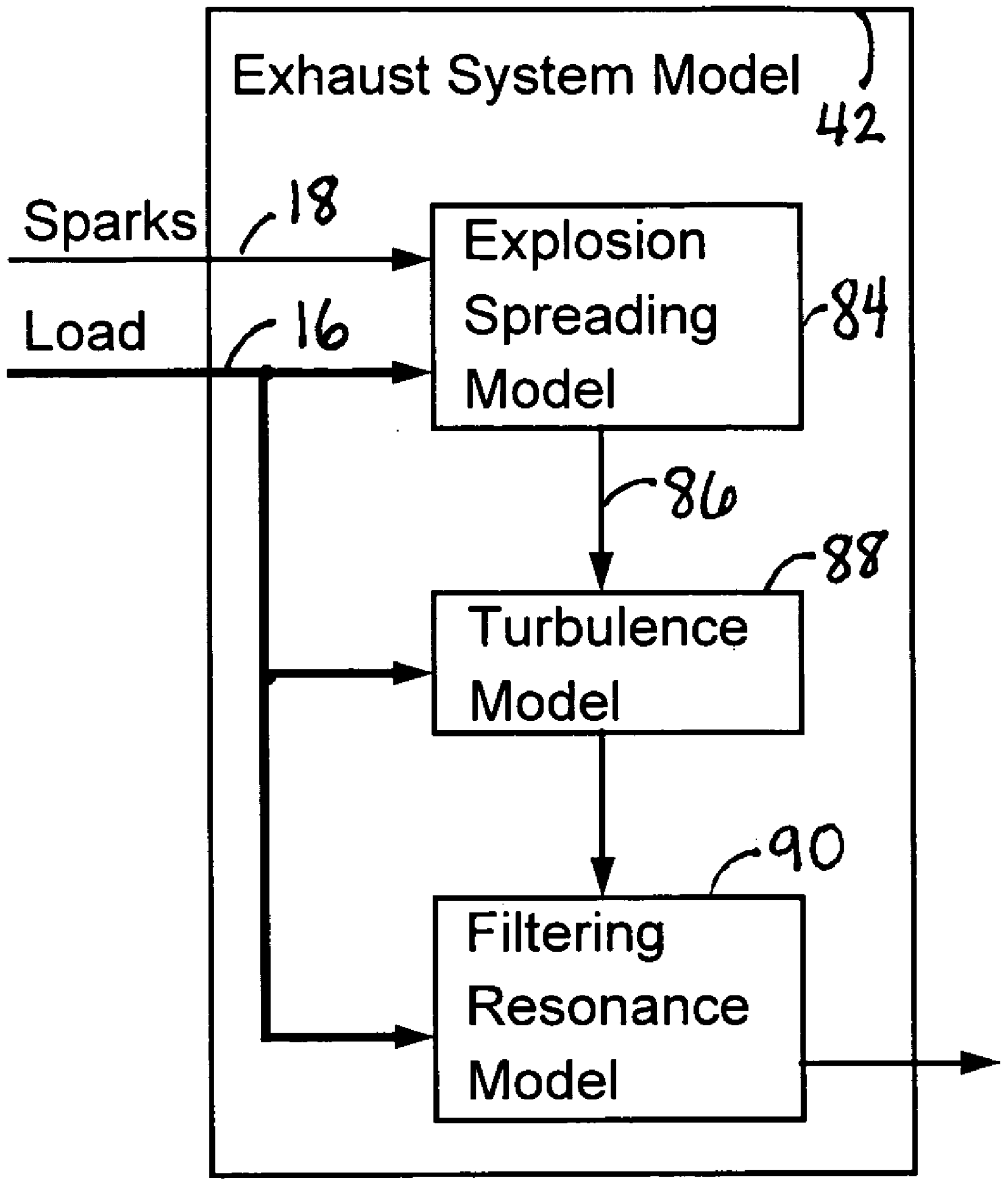
FIG. 9 is a block diagram illustrating an example of an exhaust system model, which preferably forms a component within the spark timing controlled sounds block of FIG. 4.

FIG. 9 is a block diagram illustrating an example of an exhaust system model 42, which preferably forms a component within the spark timing controlled sounds block 20 of FIG. 4. The spark impulse signals 18 first enter an explosion spreading model 84, which simulates the spreading of the initial pressure wave of the ignition explosion. In preferred embodiments, this explosion spreading block is implemented with a lowpass filter designed to spread the impulses.

The spreaded signal 86 from the explosion spreading model 84 is then input to a turbulence model 88, which simulates the various constrictions and/or bends in the exhaust system waveguide. These bends and constrictions introduce noise into the signal, with the amount of noise depending on the velocity of the pressure wave. The turbulence model is preferably implemented using filtered white noise that is introduced into the signal in proportion with the signal intensity.

After passing through the turbulence model 88, the signal enters a filtering resonance model 90, which is designed to simulate the exhaust muffler. This filter is preferably implemented using a few second-order resonant lowpass filters connected in parallel.

Because filtering and turbulence happen at various places along the exhaust path, and because turbulence is not a linear filtering, it is preferred in a more realistic exhaust system implementation to cascade multiple turbulence-filtering pairs, rather than just one pair as shown in the figure. In addition, certain pairs may be connected in parallel rather than cascaded. Very realistic sounds, however, can be produced using just one turbulence-filtering pair.

Figure 10:
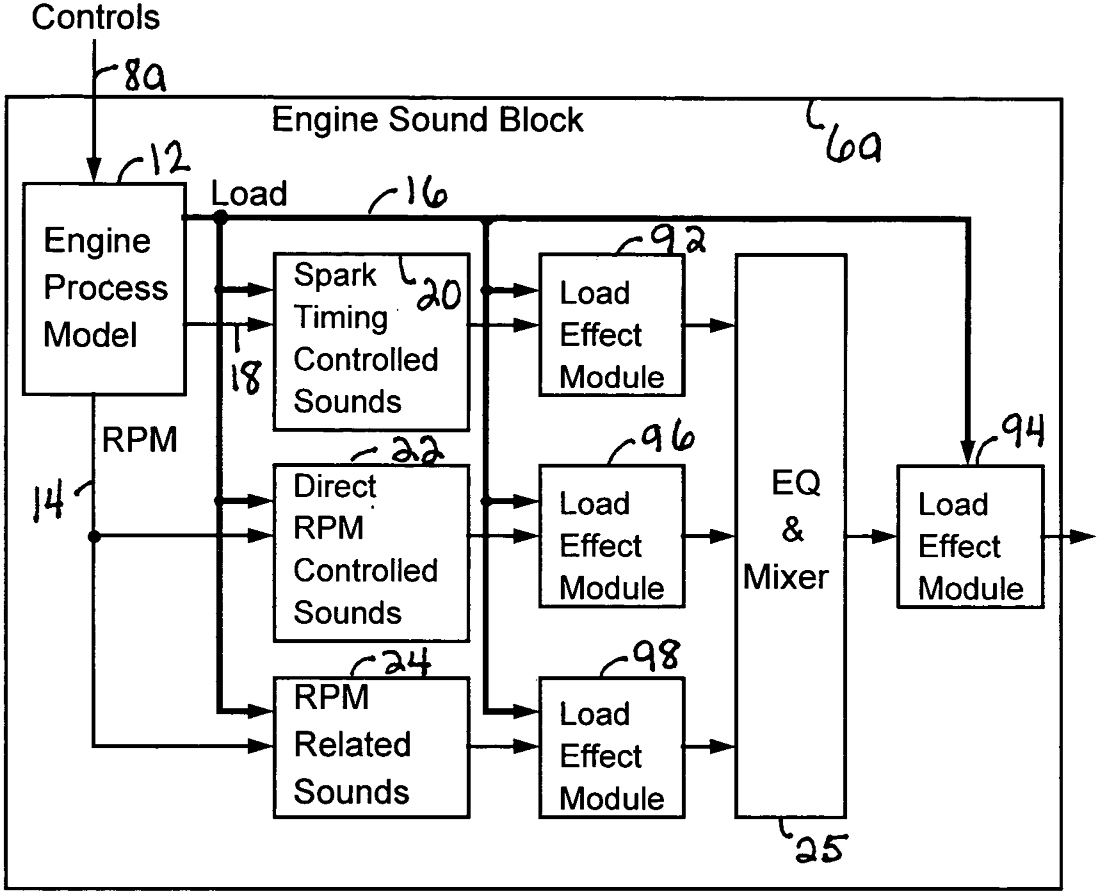
FIG. 10 is a diagram illustrating a variation of the engine sound block shown in FIG. 2, wherein optional load effect modules are included.

FIG. 10 is a diagram illustrating a variation of the engine sound block 6*a* shown in FIG. 2. This variation of the engine sound block is the same as that described in relation to FIG. 2, with the exception that one or more optional load effect modules may be included, as shown. Preferably, the modules are inserted in one of three ways: 1) a single module 92 between the spark timing controlled sounds and the equalizer and mixer block 25, 2) a single module after the equalizer and mixer block 94, or 3) three modules 92, 96, 98, where each one is inserted just before the equalizer and mixer block 25, as shown, with inputs from the engine load signal 16 and, respectively, the spark timing controlled sounds 22, the direct RPM controlled sounds 22, and the RPM related sounds 24. Other configurations are also possible.

Figure 11:
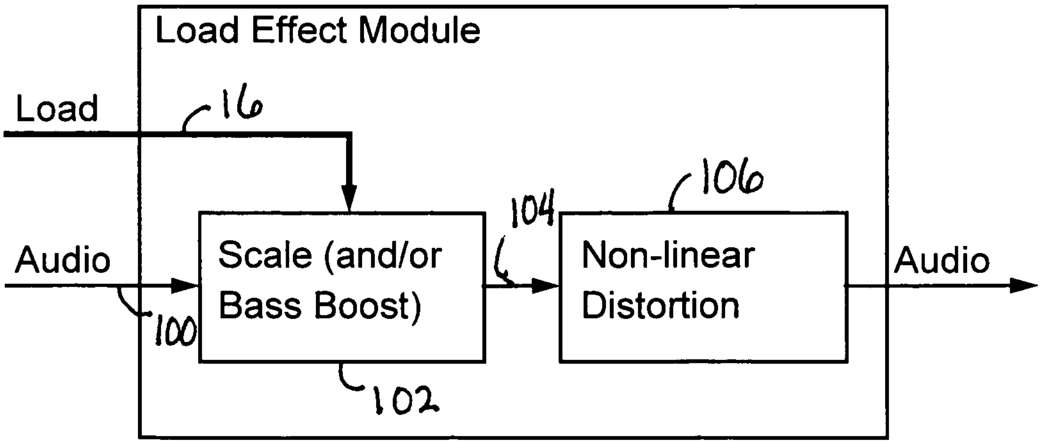
FIG. 11 is a diagram illustrating the details of the load effect modules shown in FIG. 10.

FIG. 11 is a diagram illustrating the details of the load effect modules shown in FIG. 10. An audio signal 100 entering the module goes into a scale block 102 which is controlled by the load signal 16. The scaled audio signal 104 then passes into a non-linear distortion unit 106. This nonlinear-distortion could be implemented as a hard clipping (meaning all input samples greater than 1 are set to 1, and all input samples less than −1 are set to −1, the rest are unmodified), or a "soft" clipping (such as a look-up table with a smooth monotonically increasing set of values centered at 0).

The load effect module simulates the "load" sound effect which happens, for example, when you push the gas pedal to the floor and accelerate a car. In this case, the load control signal would increase the scaling of the audio input, causing the non-linear distortion to produce a more "loaded" (i.e., broader spectrum) sound.

An alternative implementation of the load effect module has a scale and low pass boosting filter instead of just a scale alone. In this way, when the load control signal is increased, the audio signal input is bass boosted and then this lower frequency signal is distorted in the nonlinear distortion element giving a more "beefy" loaded sound.

We claim:

1. A method of synthesizing sound signals associated with a vehicle having an engine, comprising:

providing to an engine process model a plurality of engine control parameters which characterize respective engine control conditions, and generating, in response to an output from said engine process model, engine related sound signals corresponding to said engine control parameters, wherein the outputs from said engine process model comprise engine load, spark event and engine rotational speed signals, and said engine process model comprises an engine physical model which generates said spark event and engine rotational speed outputs, and a load behavior model which generates said engine load output, said engine physical model comprising a starter motor model which provides an initial engine shaft rotational speed signal in response to an engine start control signal, an angular integrator which generates an engine shaft angle signal from said engine shaft rotational speed signal, and a spark timing model that generates said spark event output to simulate the firing of sparks at multiple shaft angles in response to said engine shaft angle signal.

2. The method of claim 1, said engine control parameters comprising at least two of engine rotational speed, engine load, vehicle acceleration, transmission gear ratio, throttle position, propeller pitch and fuel mixture.

3. The method of claim 1, wherein spark timing controlled sound signals are generated in response to said engine load and spark event outputs from said engine process model.

4. The method of claim 1, said engine physical model further comprising a spark force-to-velocity converter that generates an engine shaft rotational speed signal corresponding to said spark event output, and a velocity regulator model that models engine rotational speed regulating factors and is connected to complete a feedback loop from the output of said spark force-to-velocity converter and the input to said angular interrogator.

5. The method of claim 1, wherein engine rotational speed related sound signals are generated in response to said engine load and engine rotational speed outputs from said engine process model.

6. The method of claim 5, wherein said engine rotational speed related sound signals comprise at least one of whistles, whines, engine roar, turbines and FM rumble.

7. The method of claim 1, wherein direct engine rotational speed sound signals are generated in response to said engine load and engine rotational speed outputs from said engine process model.

8. The method of claim 7, wherein said direct engine rotational speed sound signals are generated by applying said engine load and engine rotational speed outputs to cross-fade loops.

9. The method of claim 7, wherein said direct engine rotational speed sound signals are generated by applying said engine load and engine rotational speed outputs to a feedback FM block.

10. The method of claim 1, wherein the outputs from said engine process model comprise engine load and spark event signals which cooperate to generate at least one of engine resonance, air chop, one-shot sound file playback and exhaust system sound signals.

11. The method of claim 10, wherein said engine load- and spark event signals are supplied to an exhaust system model that includes at least one of explosion spreading, turbulence and filtering resonance models to generate said exhaust system sound signal.

12. The method of claim 10, wherein said engine load and spark event signals cooperate to generate an engine resonance sound signal, and said engine load signal and engine resonance sound signal cooperate to generate a turbulence sound signal.

13. A method of synthesizing sound signals associated with a vehicle having an engine, comprising:

providing to an engine process model a plurality of engine control parameters which characterize respective engine control conditions, and generating, in response to an output from said engine process model, engine related sound signals corresponding to said engine control parameters, wherein the outputs from said engine process model comprise engine load and spark event signals which cooperate to generate at least one of engine resonance, air chop, one-shot sound file playback and exhaust system sound signals, and said engine load and spark event signals are supplied to an exhaust system model that includes at least one of explosion spreading, turbulence and filtering resonance models to generate said exhaust system sound signal, and wherein said load and spark event signals are supplied to an explosion spreading model within said exhaust system model which simulates the spreading of the initial pressure wave of an ignition explosion, and only said load signal is supplied to a turbulence model that simulates constrictions and/or bends in an exhaust system waveguide, and a filtering resonance model that simulates an exhaust muffler, the output of said explosion spreading model providing an input to said turbulence model, the output of said turbulence model providing an input to said filtering resonance model, and the output from said filtering resonance model providing said exhaust system sound signal.

14. The method of claim 13, said engine control parameters comprising at least two of engine rotational speed, engine load, vehicle acceleration, transmission gear ratio, throttle position, propeller pitch and fuel mixture.

15. The method of claim 13, wherein the outputs from said engine process model comprise engine load and spark event signals which cooperate to generate at least one of engine resonance, air chop, one-shot sound file playback and exhaust system sound signals.

16. The method of claim 15, wherein said engine load and spark event signals are supplied to an exhaust system model that includes at least one of explosion spreading, turbulence and filtering resonance models to generate said exhaust system sound signal.

17. The method of claim 15, wherein said engine load and spark event signals cooperate to generate an engine resonance sound signal, and said engine load signal and engine resonance sound signal cooperate to generate a turbulence sound signal.

18. The method of claim 13, wherein the outputs from said engine process model comprise engine load, spark event and engine rotational speed signals.

19. The method of claim 18, wherein spark timing controlled sound signals are generated in response to said engine load and spark event outputs from said engine process model.

20. The method of claim 18, wherein said engine process model comprises an engine physical model which generates said spark event and engine rotational speed outbursts, and a load behavior model which generates said engine load output.

21. The method of claim 18, wherein engine rotational speed related sound signals are generated in response to said engine load and engine rotational speed outputs from said engine process model.

22. The method of claim 21, wherein said engine rotational speed related sound signals comprise at least one of whistles, whines, engine roar, turbines and FM rumble.

23. The method of claim 18, wherein direct engine rotational speed sound signals are generated in response to said engine load and engine rotational speed outputs from said engine process model.

24. The method of claim 23, wherein said direct engine rotational speed sound signals are generated by applying said engine load and engine rotational speed outputs to a feedback FM block.

25. The method of claim 23, wherein said direct engine rotational speed sound signals are generated by applying said engine load and engine rotational speed outputs to cross-fade loops.

26. Apparatus for synthesizing sound signals associated with a vehicle having an engine, comprising:

an engine control input which provides a plurality of engine control parameters characterizing respective engine control conditions, and an engine related sound synthesizer which generates engine related sound signals corresponding to said engine control parameters, wherein said engine control input provides said engine control parameters to an engine process model, said engine related sound signal synthesizer generates said engine related sound signals in response to an output from said engine process model, the outputs from said engine process model comprise engine load, spark event and engine rotational speed signals, and said engine process model comprises an engine physical model which generates said spark event and engine rotational speed outputs, and a load behavior model which generates said engine load output, said engine physical model comprising a starter motor model which provides an initial engine shaft rotational speed signal in response to an engine start control signal, an angular integrator which generates an engine shaft angle signal from said engine shaft rotational speed signal, and a spark timing model that generates said spark event output to simulate the firing of sparks at multiple shaft angles in response to said engine shaft angle signal.

27. The apparatus of claim 26, said engine control parameters comprising at least two of engine rotational speed, engine load, vehicle acceleration, transmission gear ratio, throttle position, propeller pitch and fuel mixture.

28. The apparatus of claim 26, wherein said engine related sound signal synthesizer generates spark timing controlled sound signals in response to said engine load and spark event outputs from said engine process model.

29. The apparatus of claim 26, said engine physical model further comprising a spark force-to-velocity converter that generates an engine shaft rotational speed signal corresponding to said spark event output, and a velocity regulator model that models engine rotational speed regulating factors and is connected to complete a feedback loop from the output of said spark force-to-velocity converter and the input to said angular integrator.

30. The apparatus of claim 26, wherein said engine related sound signal synthesizer generates engine rotational speed related sound signals in response to said engine load and engine rotational speed outputs from said engine process model.

31. The apparatus of claim 30, wherein said engine rotational speed related sound signals comprise at least one of whistles, whines, engine roar, turbines and FM rumble.

32. The apparatus of claim 26 wherein said engine related sound signal synthesizer generates direct engine rotational speed sound signals in response to said engine load and engine rotational speed outputs from said engine process model.

33. The apparatus of claim 32, wherein said engine related sound signal synthesizer generates said direct engine rotational speed sound signals by applying said engine load and engine rotational speed outputs to cross-fade loops.

34. The apparatus of claim 32, wherein said engine related sound signal synthesizer generates said direct engine rotational speed sound signals by applying said engine load and engine rotational speed outputs to a feedback FM block.

35. The apparatus of claim 26 wherein the outputs from said engine process model comprise engine load and spark event signals which cooperate to generate at least one of engine resonance, air chop, one-shot sound file playback and exhaust system sound signals.

36. The apparatus of claim 35, wherein said engine process model supplies said engine load and spark event signals to an exhaust system model that includes at least one of explosion spreading, turbulence and filtering resonance models to generate said exhaust system sound signal.

37. The apparatus of claim 35, wherein said engine load and spark event signals cooperate to generate an engine resonance sound signal, and said engine load signal and engine resonance sound signal cooperate to generate a turbulence sound signal.

38. Apparatus for synthesizing sound signals associated with a vehicle having an engine, comprising:

an engine control input which provides a plurality of engine control parameters characterizing respective engine control conditions, and an engine related sound synthesizer which generates engine relates sound signals corresponding to said engine control parameters, wherein said engine control input provides said engine control parameters to an engine process model, said engine related sound signal synthesizer generates said engine relates sound signals in response to an output from said engine process model, the outputs from said engine process model comprise engine load and spark event signals which cooperate to generate at least one of engine resonance, air chop, one-shot sound file playback and exhaust system sound signals, said engine process model supplies said engine load and spark event signals to an exhaust system model that includes at least one of explosion spreading, turbulence and filtering resonance models to generate said exhaust system sound signal, and wherein said engine process model supplies said load and spark event signals to an explosion spreading model within said exhaust system model which simulates the spreading of the initial pressure wave of an ignition explosion, and only said load signal to a turbulence model that simulates constrictions and/or bends in an exhaust system waveguide, further comprising a filtering resonance model that simulates an exhaust muffler, the output of said explosion spreading model providing an input to said turbulence model, the output of said turbulence model providing an input to said filtering resonance model, and the output from said filtering resonance model providing said exhaust system sound signal.

39. The apparatus of claim 38, said engine control parameters comprising at least two of engine rotational speed, engine load, vehicle acceleration, transmission gear ratio, throttle position, propeller pitch and fuel mixture.

40. The apparatus of claim 38, wherein said engine load and spark event signals cooperate to generate an engine resonance sound signal, and said engine load signal and engine resonance sound signal cooperate to generate a turbulence sound signal.

41. The apparatus of claim 38, wherein the outputs from said engine process model comprise engine load, spark event and engine rotational speed signals.

42. The apparatus of claim 41, wherein said engine related sound signal synthesizer generates spark timing controlled sound signals in response to said engine load and spark event outputs from said engine process model.

43. The apparatus of claim 41, wherein said engine related sound signal synthesizer generates engine rotational speed related sound signals in response to said engine load and engine rotational speed outputs from said engine process model.

44. The apparatus of claim 43, wherein said engine rotational speed related sound signals comprise at least one of whistles, whines, engine roar, turbines and FM rumble.

45. The apparatus of claim 41, wherein said engine process model comprises an engine physical model which generates said spark event and engine rotational speed outputs, and a load behavior model which generates said engine load output.

46. The apparatus of claim 45, said engine physical model comprising a starter motor model which provides an initial engine shaft rotational speed signal in response to an engine start control signal, an angular integrator which generates an engine shaft angle signal from said engine shaft rotational speed signal, and a spark timing model that generates said spark event output to simulate the firing of sparks at multiple shaft angles in response to said engine shaft angle signal.

47. The apparatus of claim 46, said engine physical model further comprising a spark force-to-velocity converter that generates an engine shaft rotational speed signal corresponding to said spark event output, and a velocity regulator model that models engine rotational speed regulating factors and is connected to complete a feedback loop from the output of said spark force-to-velocity converter and the input to said angular integrator.

48. The apparatus of claim 41, wherein said engine related sound signal synthesizer generates direct engine rotational speed sound signals in response to said engine load and engine rotational speed outputs from said engine process model.

49. The apparatus of claim 48, wherein said engine related sound signal synthesizer generates said direct engine rotational speed sound signals by applying said engine load and engine rotational speed outputs to cross-fade loops.

50. The apparatus of claim 48, wherein said engine related sound signal synthesizer generates said direct engine rotational speed sound signals by applying said engine load and engine rotational speed outputs to a feedback FM block.

* * * * *